(12) United States Patent
Ishida et al.

(10) Patent No.: US 10,365,603 B2
(45) Date of Patent: Jul. 30, 2019

(54) DRIVE DEVICE AND IMAGE FORMING APPARATUS INCORPORATING THE DRIVE DEVICE

(71) Applicants: Masahiro Ishida, Kanagawa (JP); Naoki Matsuda, Kanagawa (JP)

(72) Inventors: Masahiro Ishida, Kanagawa (JP); Naoki Matsuda, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 16/002,057

(22) Filed: Jun. 7, 2018

(65) Prior Publication Data

US 2018/0284685 A1    Oct. 4, 2018

Related U.S. Application Data

(63) Continuation of application No. 15/088,540, filed on Apr. 1, 2016, now Pat. No. 10,012,942.

(30) Foreign Application Priority Data

Apr. 2, 2015   (JP) .................................. 2015-075936

(51) Int. Cl.
*G03G 15/00* (2006.01)
*G03G 21/16* (2006.01)
*F16H 57/028* (2012.01)

(52) U.S. Cl.
CPC ......... *G03G 15/757* (2013.01); *F16H 57/028* (2013.01); *G03G 21/1647* (2013.01); *G03G 2221/1657* (2013.01)

(58) Field of Classification Search
CPC . F16H 57/028; F16H 1/22; F16H 1/20; F16H 1/203; F16H 1/206; F16H 1/222; F16H 1/227; G03G 15/757
(Continued)

(56) References Cited

U.S. PATENT DOCUMENTS 5,012,693 A    5/1991   Enomoto et al.
5,761,580 A    6/1998   Harada et al.
(Continued)

FOREIGN PATENT DOCUMENTS

JP    H04469 A       1/1992
JP    H06161166 A    6/1994
(Continued)

OTHER PUBLICATIONS

Machine translation into English of JP H-11311302 (Year: 1999).*
(Continued)

*Primary Examiner* — Walter L Lindsay, Jr.
*Assistant Examiner* — Arlene Heredia
(74) *Attorney, Agent, or Firm* — Harness, Dickey & Pierce, P.L.C.

(57) ABSTRACT

A drive device, which is incorporated in an image forming apparatus, includes a drive motor and a plurality of gears driven by the drive motor. The plurality of gears include at least two gears disposed coaxially with each other and have a plurality of meshing portions. Each meshing portion is formed between a pair of gears of the plurality of gears. A difference between respective gear mesh frequencies of the plurality of meshing portions is set equal to or smaller than 100 Hz.

11 Claims, 8 Drawing Sheets

(58) Field of Classification Search
USPC .................. 476/64, 28, 32; 474/148
See application file for complete search history.

(56) References Cited

U.S. PATENT DOCUMENTS

| | | | |
|---|---|---|---|
| 6,125,253 | A * | 9/2000 | Tashima ............ G03G 15/757 |
| | | | 399/167 |
| 6,188,857 | B1 | 2/2001 | Yamanaka et al. |
| 6,289,805 | B1 | 9/2001 | Douillard et al. |
| 6,931,997 | B2 | 8/2005 | Hohl |
| 9,322,458 | B2 | 4/2016 | Matsuda et al. |
| 2003/0113133 | A1 | 6/2003 | Ryuzaki et al. |
| 2006/0055258 | A1 | 3/2006 | Tsergas |
| 2007/0003321 | A1 | 1/2007 | Hara et al. |
| 2007/0151794 | A1 | 7/2007 | Mizutani et al. |
| 2007/0223962 | A1 | 9/2007 | Shiraki |
| 2008/0022800 | A1 | 1/2008 | Kobayashi |
| 2008/0069635 | A1 | 3/2008 | Maehata et al. |
| 2009/0190956 | A1 | 7/2009 | Carter et al. |
| 2011/0158711 | A1 * | 6/2011 | Fukushima ......... G03G 15/757 |
| | | | 399/297 |
| 2011/0170892 | A1 | 7/2011 | Ishida et al. |
| 2011/0280627 | A1 | 11/2011 | Matsuda |
| 2011/0293328 | A1 | 12/2011 | Matsuda et al. |
| 2012/0060633 | A1 | 3/2012 | Ishida et al. |
| 2012/0125729 | A1 | 5/2012 | Jimbo |
| 2012/0160602 | A1 | 6/2012 | Furuta |
| 2012/0201571 | A1 * | 8/2012 | Yamazaki ......... G03G 15/0189 |
| | | | 399/167 |
| 2014/0123796 | A1 | 5/2014 | Ishida et al. |
| 2014/0196561 | A1 | 7/2014 | Takahashi et al. |
| 2014/0270851 | A1 | 9/2014 | Matsuda et al. |
| 2015/0117918 | A1 | 4/2015 | Suzuki |
| 2015/0241834 | A1 | 8/2015 | Nakamura |
| 2015/0309467 | A1 | 10/2015 | Ishida et al. |
| 2015/0343816 | A1 | 12/2015 | Kawase et al. |
| 2015/0344809 | A1 | 12/2015 | Kabata et al. |
| 2015/0345614 | A1 | 12/2015 | Kabata et al. |
| 2015/0369338 | A1 | 12/2015 | Sugita et al. |
| 2015/0370214 | A1 | 12/2015 | Ishida et al. |
| 2015/0370215 | A1 | 12/2015 | Sugita et al. |
| 2016/0033928 | A1 | 2/2016 | Ishimitsu et al. |
| 2016/0085204 | A1 | 3/2016 | Matsuda et al. |
| 2016/0238033 | A1 | 8/2016 | Fang et al. |

FOREIGN PATENT DOCUMENTS

| | | |
|---|---|---|
| JP | H11311302 A | 11/1999 |
| JP | 2000-235396 A | 8/2000 |
| JP | 2001-117451 A | 4/2001 |
| JP | 2002-189325 A | 7/2002 |
| JP | 2003-240065 A | 8/2003 |
| JP | 2007-112397 A | 5/2007 |
| JP | 2007-145088 A | 6/2007 |
| JP | 2009197754 A | 9/2009 |
| JP | 2014-111983 A | 6/2014 |
| JP | 2014-169723 A | 9/2014 |
| WO | WO-2007049444 A1 | 5/2007 |

OTHER PUBLICATIONS

U.S. Appl. No. 14/947,474, filed Nov. 20, 2015.
U.S. Appl. No. 14/950,318, filed Nov. 24, 2015.
U.S. Appl. No. 14/965,077, filed Dec. 10, 2015.
U.S. Appl. No. 14/947,246, filed Nov. 20, 2015.
U.S. Appl. No. 15/008,809, filed Jan. 28, 2016.
U.S. Appl. No. 15/010,758, filed Jan. 29, 2016.
U.S. Appl. No. 14/962,113, filed Dec. 8, 2015.
U.S. Appl. No. 14/978,890, filed Dec. 22, 2015.

* cited by examiner

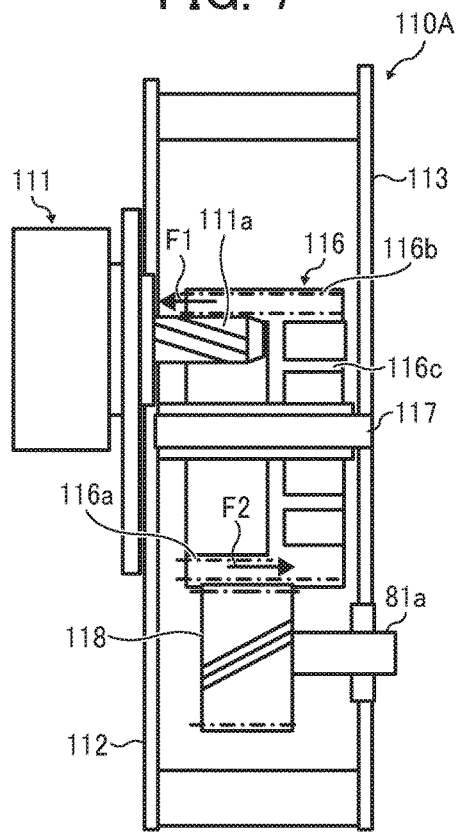
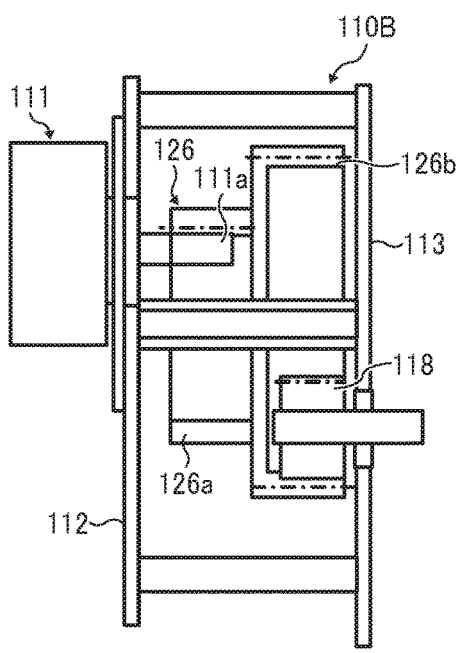

DRIVE DEVICE AND IMAGE FORMING APPARATUS INCORPORATING THE DRIVE DEVICE

CROSS-REFERENCE TO RELATED APPLICATIONS

This patent application is a continuation of and claims priority under 35 U.S.C. §§ 120/121 to U.S. application Ser. No. 15/088,540 filed on Apr. 1, 2016, which is based on and claims priority pursuant to 35 U.S.C. § 119(a) to Japanese Patent Application No. 2015-075936, filed on Apr. 2, 2015, in the Japan Patent Office, the entire disclosures of each of which are hereby incorporated by reference herein.

BACKGROUND

Technical Field

This disclosure relates to a drive device and an image forming apparatus incorporating the drive device.

Related Art

Various types of image forming apparatuses include copiers, printers, facsimile machine, or multifunction peripherals (MFPs) having two or more of copying, printing, scanning, facsimile transmission, plotter, and other capabilities. Such image forming apparatuses include multiple drive devices for image formation. The multiple drive devices are used for operations of a photoconductor and a transfer belt.

For example, a known drive device includes a motor that includes a motor gear, an internal gear that meshes with the motor gear, an external gear that is coaxially mounted with the internal gear and rotates together with the internal gear, and an output gear that meshes with the external gear and outputs a driving force to a drive transmission object.

SUMMARY

At least one aspect of this disclosure provides a drive device including a drive motor and a plurality of gears driven by the drive motor. The plurality of gears include at least two gears disposed coaxially with each other and has a plurality of meshing portions. Each meshing portion is formed between a pair of gears of the plurality of gears. A difference between respective gear mesh frequencies of the plurality of meshing portions is set equal to or smaller than 100 Hz.

Further, at least one aspect of this disclosure provides an image forming apparatus including the above-described drive device and an image forming device to receive a driving force transmitted from the drive device.

BRIEF DESCRIPTION OF THE SEVERAL VIEWS OF THE DRAWINGS

FIG. 7 is a schematic cross sectional view illustrating a drive device of Variation 1;

FIG. 8 is a schematic cross sectional view illustrating a drive device of Variation 2;

DETAILED DESCRIPTION

Figure 1:
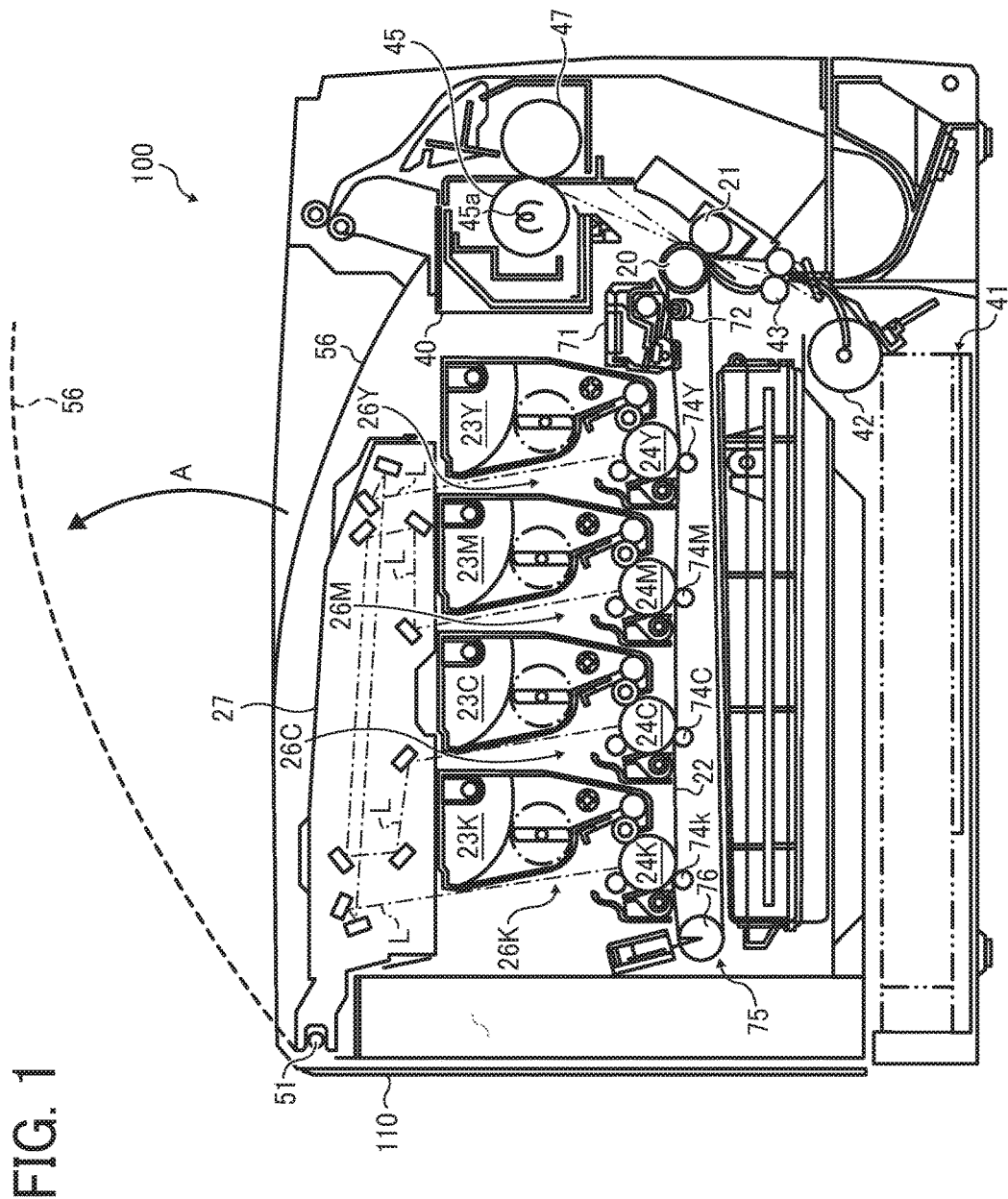
FIG. 1 is a schematic view illustrating an image forming apparatus according to an embodiment of this disclosure.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

Now, a description is given of an electrophotographic image forming apparatus 100 for forming images by electrophotography, according to an embodiment of this disclosure. It is to be noted that, hereinafter, the electrophotographic image forming apparatus 100 is referred to as the image forming apparatus 100.

At first, a description is given of a basic configuration of the image forming apparatus 100 according to the present embodiment of this disclosure.

FIG. 1 is a schematic view illustrating an image forming apparatus 100 according to the present embodiment of this disclosure. The image forming apparatus 100 includes four process units 26K, 26C, 26M, and 26Y to form respective toner images of black (K), cyan (C), magenta (M), and yellow (Y). The configurations of the process units 26K, 26C, 26M, and 26Y are basically identical to each other, except that the process units 26K, 26C, 26M, and 26Y include toners of different colors. Each of the process units 26K, 26C, 26M, and 26Y is replaced at the end of its service life.

It is to be noted that identical parts are given identical reference numerals and redundant descriptions are summarized or omitted accordingly.

The image forming apparatus 100 may be a copier, a facsimile machine, a printer, a multifunction peripheral or a multifunction printer (MFP) having at least one of copying, printing, scanning, facsimile, and plotter functions, or the like. According to the present example, the image forming apparatus 100 is an electrophotographic copier that forms toner images on recording media by electrophotography.

It is to be noted in the following examples that: the term "image forming apparatus" indicates an apparatus in which an image is formed on a recording medium such as paper, OHP (overhead projector) transparencies, OHP film sheet, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., a OHP sheet), a fabric sheet and so forth, and is used to which the developer or ink is attracted. In addition, the "sheet" is not limited to a flexible sheet but is applicable to a rigid plate-shaped sheet and a relatively thick sheet.

Further, size (dimension), material, shape, and relative positions used to describe each of the components and units are examples, and the scope of this disclosure is not limited thereto unless otherwise specified.

Further, it is to be noted in the following examples that: the term "sheet conveying direction" indicates a direction in which a recording medium travels from an upstream side of a sheet conveying path to a downstream side thereof; the term "width direction" indicates a direction basically perpendicular to the sheet conveying direction.

Figure 2:
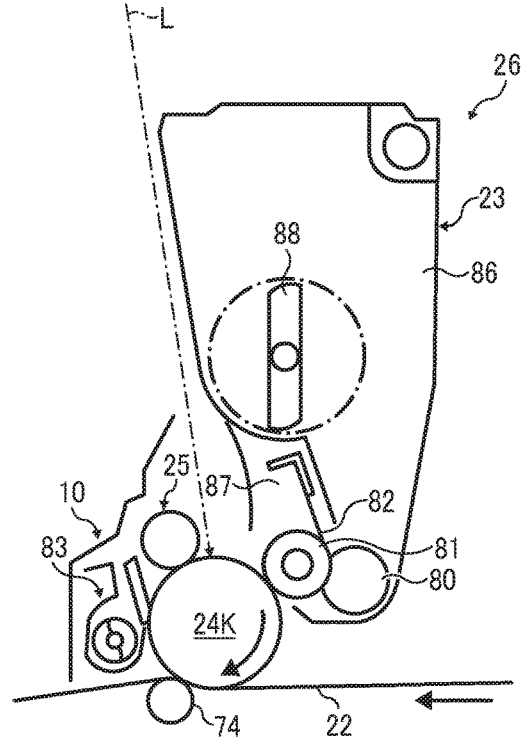
FIG. 2 is a schematic view illustrating a process unit included in the image forming apparatus of FIG. 1.

FIG. 2 is a schematic view illustrating one of the process units 26K, 26C, 26M, and 26Y.

Since the process units 26K, 26C, 26M, and 26Y have respective configurations identical to each other except the toner colors, the process unit 26 and image forming components included in the process unit 26 are described without suffixes indicating the toner colors, which are K, C, M, and Y.

As illustrated in FIG. 2, the process unit 26 includes a photoconductor unit 10 and a developing unit 23. The photoconductor unit 10 supports a drum-shaped photoconductor 24 that functions as an image bearer, a photoconductor cleaning device 83, a static eliminating device, and a charging device 25. The process unit 26 is detachably attachable to an apparatus body of the image forming apparatus 100, and consumable parts of the process unit 26 can be replaced at one time.

The charging device 25 uniformly charges a surface of the photoconductor 24 that is rotated by a drive unit in a clockwise direction in FIG. 2. An optical writing unit 27 emits a laser light beam L so as to irradiate the uniformly charged surface of the photoconductor 24 to form an electrostatic latent image of each single color toner. The developing unit 23 incorporating toner develops the electrostatic latent image into a toner image. Then, the toner image is primarily transferred onto a surface of an intermediate transfer belt 22.

The photoconductor cleaning device 83 removes residual toner remaining on the surface of the photoconductor 24 after a primary transfer operation. Further, the static eliminating device removes residual electric potential remaining on the surface of the photoconductor 2 after the photoconductor cleaning device 83 has cleaned the surface of the photoconductor 24. This removal of static electricity initializes the surface of the photoconductor 24, so as to prepare for a subsequent image formation.

The developing unit 23 includes a hopper 86 and a developing section 87. The hopper 86 is a vertically long member to contain toner that functions as developer. The hopper 86 that functions as a developer container includes an agitator 88 and a toner supply roller 80. The agitator 88 is rotated by the drive unit. The toner supply roller 80 that functions as a developer supplier is disposed at a portion vertically lower from the agitator 88 and is rotated by the drive unit. Toner contained in the hopper 86 moves toward the toner supply roller 80 by the force of gravity while being agitated due to rotation of the agitator 88. The toner supply roller 80 includes a metallic cored bar and a roller including foam resin covering a surface of the metallic cored bar. The toner supply roller 80 rotates while collecting the toner accumulated at a lower part of the hopper 86 to the surface of the toner supply roller 80.

The developing section 87 of the developing unit 23 includes a developing roller 81 and a thin layer forming blade 82. The developing roller 81 rotates while contacting the photoconductor 24 and the toner supply roller 80. The thin layer forming blade 82 has a leading edge to contact a surface of the developing roller 81. The toner adhering to the toner supply roller 80 in the hopper 86 is supplied to the surface of the developing roller 81 at a contact portion at which the developing roller 81 and the toner supply roller 80 contact each other. The toner supplied onto the surface of the developing roller 81 passes the contact position at which the developing roller 81 and the thin layer forming blade 82 contact each other along with rotation of the developing roller 81. At this time, the thickness of layer of toner on the surface of the developing roller 81 is regulated. After the thickness of layer is regulated, the toner adheres to the electrostatic latent image formed on the surface of the photoconductor 24 in a development region that corresponds to a contact portion of the developing roller 81 and the photoconductor 24. This adhesion of toner develops the electrostatic latent image into a visible toner image.

Such toner image formation is performed in each process unit 26 (i.e., the process units 26K, 26C, 26M, and 26Y), so that a single color toner image of each process unit 26 is formed on the surface of the photoconductor 24 (i.e., the photoconductors 24K, 24C, 24M, and 24Y).

As illustrated in FIG. 1, an optical writing unit 27 is disposed vertically above the process units 26K, 26C, 26M, and 26Y. The optical writing unit 27 functions as a latent image writing device. The optical writing unit 27 emits laser light L from a laser diode based on image data to optically scan the photoconductors 24K, 24C, 24M, and 24Y in the process units 26K, 26C, 26M, and 26Y, respectively. Due to this optical scanning, an electrostatic latent image is formed on the surface of each photoconductor 24. In this configuration, the optical writing unit 27 and the four process units 26K, 26C, 26M, and 26Y form an image forming device that forms respective black, cyan, magenta, and yellow toner images, which are visible images of different colors from each other, on the photoconductors 24K, 24C, 24M, and 24Y.

While causing a polygon motor to rotate a polygon mirror so as to deflect the laser light L emitted by the light source in a main scanning direction, the optical writing unit 27 irradiates the deflected laser light L to the photoconductor 24 via multiple optical lenses and mirrors. The optical writing unit 27 may be a device that performs optical writing by LED light emitted by multiple light emitting diodes (LEDs) of an LED array.

A transfer unit 75 is disposed vertically below the photoconductors 24K, 24C, 24M, and 24Y. The transfer unit 75 functions as a belt unit that rotates endlessly in a counterclockwise direction in FIG. 1 while stretching the endless intermediate transfer belt 22 with tension. The transfer unit 75 includes the intermediate transfer belt 22, a drive roller 76, a tension roller 20, four primary transfer rollers 74K, 74C, 74M, and 74Y, a secondary transfer roller 21, a belt cleaning device 71, and a cleaning backup roller 72.

The intermediate transfer belt 22 functions as a belt member as well as a transfer roller. The intermediate transfer belt 22 is stretched by the drive roller 76, the tension roller 20, the cleaning backup roller 72, and the four primary transfer rollers 74K, 74C, 74M, and 74Y, which are disposed inside the loop of the intermediate transfer belt 22. Then, due to a rotation force of the drive roller 76 that is rotated by a drive unit in the counterclockwise direction in FIG. 1, the intermediate transfer belt 22 is endlessly rotated in the same direction as the drive roller 76.

The four primary transfer rollers 74K, 74C, 74M, and 74Y hold the intermediate transfer belt 22 that rotates endlessly with the photoconductors 24K, 24C, 24M, and 24Y. By so doing, four primary transfer nip regions are formed on respective four positions where a front face of the intermediate transfer belt 22 and respective photoconductors 24K, 24C, 24M, and 24Y contact.

Primary transfer biases are applied by a transfer power supply to the primary transfer rollers 74K, 74C, 74M, and 74Y, respectively. Accordingly, a transfer electric field is formed in each transfer nip region formed between the electrostatic latent image of the photoconductor 24 (i.e., the photoconductors 24K, 24C, 24M, and 24Y) and the primary transfer roller 74 (i.e., the primary transfer rollers 74K, 74C, 74M, and 74Y). It is to be noted that the primary transfer roller 74 may be replaced with a transfer charger or a transfer brush.

The yellow toner image formed on the surface of the photoconductor 24Y of the process unit 26Y enters the primary transfer nip region as the photoconductor 24Y rotates. In the primary transfer nip region for yellow toner image, due to the transfer electric field and a nip pressure, the yellow toner image is primarily transferred from the photoconductor 24Y onto the intermediate transfer belt 22. After the yellow toner image is primarily transferred onto the intermediate transfer belt 22, the intermediate transfer belt 22 continues to rotate endlessly. As the intermediate transfer belt 22 rotates and passes the primary transfer nip regions for magenta, cyan, and black toner images, the magenta, cyan, and black toner images formed on the photoconductors 24M, 24C, and 24K are also primarily transferred and sequentially overlaid onto the intermediate transfer belt 22. By primarily transferring the single color toner images, a four-color toner image is formed on the intermediate transfer belt 22.

The secondary transfer roller 21 included in the transfer unit 75 is disposed outside the loop of the intermediate transfer belt 22 to hold the intermediate transfer belt 22 with the tension roller 20 disposed inside the loop of the intermediate transfer belt 22. By so doing, a secondary transfer nip region is formed between a front face of the intermediate transfer belt 22 and the secondary transfer roller 21. A secondary transfer bias is applied by the transfer bias power supply to the secondary transfer roller 21. This application of the secondary transfer bias forms a secondary transfer electric field between the secondary transfer roller 21 and the tension roller 20 that is electrically grounded.

A sheet tray 41 is disposed vertically below the transfer unit 75. The sheet tray 41 accommodates multiple recording media in a bundle of sheets. The sheet tray 41 is slidably and detachably attached to an apparatus body of the image forming apparatus 100. The sheet tray 41 includes a feed roller 42 that is disposed in contact with a recording medium that is placed on top of the bundle of sheets. As the feed roller 42 rotates in the counterclockwise direction in FIG. 1 at a predetermined timing, the recording medium is fed toward a sheet conveying path.

A pair of registration rollers 42 is disposed at a far end of the sheet conveying path. The pair of registration rollers 43 includes two registration rollers. The pair of registration rollers 43 stops rotating at on receiving the recording medium fed from the sheet tray 41 between the two registration rollers. In synchronization of arrival of the four-color toner image formed on the intermediate transfer belt 22 in the secondary transfer nip region, the pair of registration rollers 43 starts rotating again to further convey the recording medium toward the secondary transfer nip region.

When the four-color toner image formed on the intermediate transfer belt 22 closely contacts the recording medium at the secondary transfer nip region, the four-color toner image is transferred onto the recording medium due to the secondary transfer electric field and the nip pressure. At this time, the four-color toner image is combined with white color of the recording medium to make a full-color toner image. By so doing, the full-color toner image is formed on a front face of the recording medium. As the recording medium with the full-color toner image on the front face passes the secondary transfer nip region, the recording medium separates from the secondary transfer roller 21 and the intermediate transfer belt 22 due to curvature separation. Then, the recording medium travels through a post-transfer conveying path and reaches a fixing device 40.

After passing through the secondary transfer nip region, residual toner that has not been transferred onto the recording medium remains on the intermediate transfer belt 22. The residual toner remaining on the surface of the intermediate transfer belt 22 is removed by the belt cleaning device 71 that is disposed in contact with the surface of the intermediate transfer belt 22. The residual toner remaining on the surface of the intermediate transfer belt 22 is removed by the belt cleaning device 71 that is disposed in contact with the surface of the intermediate transfer belt 22.

The fixing device 40 includes a fixing roller 45 and a pressure roller 47. The fixing roller 45 includes a heat generating source 45a such as a halogen lamp. The pressure roller 47 rotates while pressing against the fixing roller 45 with a predetermined pressing force. The fixing roller 45 and the pressure roller 47 contact each other to form a fixing nip region. The recording medium conveyed to the fixing device 40 is held in the fixing nip region such that a face on which an unfixed toner image is formed contacts the fixing roller 45. Then, toner in the unfixed toner image melts by application of heat and pressure, so that the full-color toner image is fixed to the recording medium.

In a single side printing mode, the recording medium discharged from the fixing device 40 is ejected to an outside of the image forming apparatus 100. Then, the recording medium is stored on a sheet stacking portion that is constructed by an upper face of a top cover 56 of the apparatus body of the image forming apparatus 100.

The top cover 56 of the apparatus body of the image forming apparatus 100 is rotatably supported by a top cover shaft 51 as indicated by arrow A in FIG. 1. By rotating in the counterclockwise direction in FIG. 1, the top cover 56 opens from the apparatus body of the image forming apparatus 100. Then, an upper opening of the apparatus body of the image forming apparatus 100 is widely exposed. In addition, the optical writing unit 27 is also rotatably supported by the top cover shaft 51. By rotating the optical writing unit 27 in the counterclockwise direction in FIG. 1, an upper face of the process units 26K, 26C, 26M, and 26Y is exposed.

The process units 26K, 26C, 26M, and 26Y are attached to and detached from the apparatus body of the image forming apparatus 100 by opening the top cover 56 and the optical writing unit 27. Specifically, by opening the top cover 56 and the optical writing unit 27, the upper face of the process units 26K, 26C, 26M, and 26Y are exposed. Then, by pulling the process units 26K, 26C, 26M, and 26Y in a vertically upward direction, the process units 26K, 26C, 26M, and 26Y are removed and taken out from the apparatus body of the image forming apparatus 100.

With this configuration, the process unit 26 that is frequently attached to and detached from the apparatus body of the image forming apparatus 100 is attached to and detached from the image forming apparatus 100 by opening the top cover 56 and the optical writing unit 27. Accordingly, attachment and detachment of the process unit 26 can be checked by allowing a user or an operator to do visual observation of the inside of the apparatus body of the image forming apparatus 100 from above without imposing difficult posture such as crouching, bending, and squatting on the user or the operator. As a result, the workload of the user or the operator can be reduce and occurrence of error in operation can be prevented.

It is to be noted that the photoconductor unit 10 and the developing unit 23 are included in the process unit 26 according to the present embodiment, so that the photoconductor unit 10 and the developing unit 23 are attached to and detached from the apparatus body of the image forming apparatus 100 together. However, the configuration is not limited thereto and the photoconductor unit 10 and the developing unit 23 can be attached to and detached from the apparatus body of the image forming apparatus 100 separately.

Next, a description is given of a drive device 110 according to the present embodiment of this disclosure.

Figure 3:
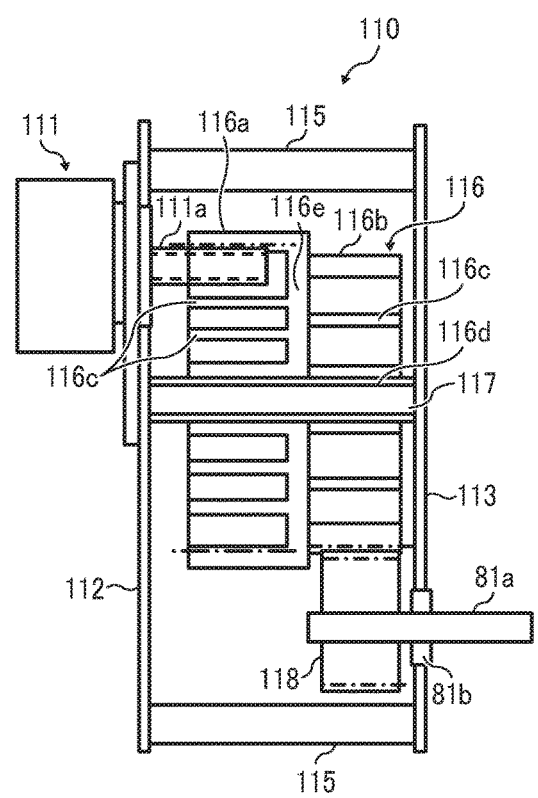
FIG. 3 is a schematic cross sectional view illustrating a drive device included in the image forming apparatus of FIG. 1.

FIG. 3 is a schematic cross sectional view illustrating the drive device 110 that is included in the image forming apparatus 100 to drive a developing roller 81.

As illustrated in FIG. 3, the drive device 110 includes a driving motor 111 and a reduction gear 116. The reduction gear 116 includes an internal gear 116a having internal teeth and an external gear 116b having external teeth. The internal teeth of the internal gear 116a are meshed with teeth of a motor gear 111a that is mounted on a motor shaft of the driving motor 111. Further, the external teeth of the external gear 116b are meshed with teeth of an output gear 118 that is mounted on a development driving shaft 81a that is connected to a shaft of the developing roller 81 via a joint.

The reduction gear 116 is rotatably supported by a support shaft 117 that is secured by caulking by a first plate 112 and a second plate 113 that is disposed facing the first plate 112. The development driving shaft 81a is rotatably supported by the second plate 113 via a bearing 81b. The driving motor 111 is attached to the first plate 112. The first plate 112 is positioned to a positioning pin 115 that is mounted on the second plate 113.

In the present embodiment, an internal gear such as the internal gear 116a is employed as a gear meshing with the motor gear 111a. By employing the internal gear, a contact ratio of the internal gear and the motor gear 111a increases, and therefore vibration and noise produced by gear operation can be restrained. Further, a meshing portion where the internal gear 116a and the motor gear 111a mesh with each other can be covered by the internal gear 116a, and therefore meshing noise of the internal gear 116a and the motor gear 111a can be blocked. The internal gear 116a is shaped like a cylinder and one side close to the motor (hereinafter, a motor side) is open. Therefore, meshing noise is heard from an opening of the internal gear 116a. In the present embodiment, however, the first plate 112 is disposed facing the opening of the internal gear 116a. Therefore, the meshing noise can be prevented from being heard outside the drive device 110 from the first plate 112.

The reduction gear 116 according to the present embodiment further includes reinforcing projections 116c, an attaching portion 116d, and a connecting portion 116e. The reinforcing projections 116c reinforce the internal gear 116a having a cylindrical shape. The support shaft 117 passes through the attaching portion 116d. The disk-shaped connecting portion 116e extends in a direction perpendicular to an axial direction of the support shaft 117. In the present embodiment, the internal gear 116a and the attaching portion 116d are connected via the connecting portion 116e. The reinforcing projections 116c are disposed on the connecting portion 116e to reinforce the connecting portion 116e. If the connecting portion 116e is deformed, the meshing of the internal gear 116a and the motor gear 111a is changed. The change of the meshing of the internal gear 116a and the motor gear 111a is likely to generate abnormal meshing vibration and abnormal wear of tooth. However, in the present embodiment, since the connecting portion 116e in the present embodiment is reinforced by the reinforcing projections 116c, deformation of the connecting portion 116e can be prevented. Therefore, the meshing vibration and the abnormal wear of tooth can be prevented. Consequently, occurrence of defect image such as banding due to meshing vibration can be prevented, and therefore high quality image can be maintained.

A driving force of the driving motor 111 is transmitted to the internal gear 116a via the motor gear 111a of the motor shaft. Then, the driving force is further transmitted to the output gear 118 that is meshed with the external gear 116b of the reduction gear 116. The driving force is further transmitted to the developing roller 81 via the development driving shaft 81a to rotate the developing roller 81 that functions as a drive transmission object.

In a case in which multiple gears are used to transmit a driving force, vibration of gear mesh frequency at the meshing portion of gears in mesh. The vibration causes the driving motor 111, a first plate 112, and a second plate 113 to vibrate, resulting in generation of noise. In order to eliminate noise, Helmholtz sound absorbers are disposed around the drive device 110, for example (see FIG. 11).

In another case in which vibration at the meshing portion is transmitted to the optical writing unit 27, for example, optical components and units in the optical writing unit 27 resonate to form a defect image such as banding. In order to eliminate such a defect image, the rigidity of optical components and units of the optical writing unit 27 is changed to prevent the optical components and units from resonating.

As another example, respective rigidities of the first plate 112, the second plate 113, and the driving motor 111 are increased to make the resonance frequencies of the first plate 112, the second plate 113, and the driving motor 111 different from the gear mesh frequency. By so doing, vibration of the first plate 112, the second plate 113, and the driving motor can be restrained. Accordingly, noise generated due to vibration of the first plate 112, the second plate 113, and the driving motor 111 can be restrained. Further, the configuration can prevent vibration from transmitting to the photoconductor 24 and the optical writing unit 27 via the first plate 112 and the second plate 113.

Figure 4:
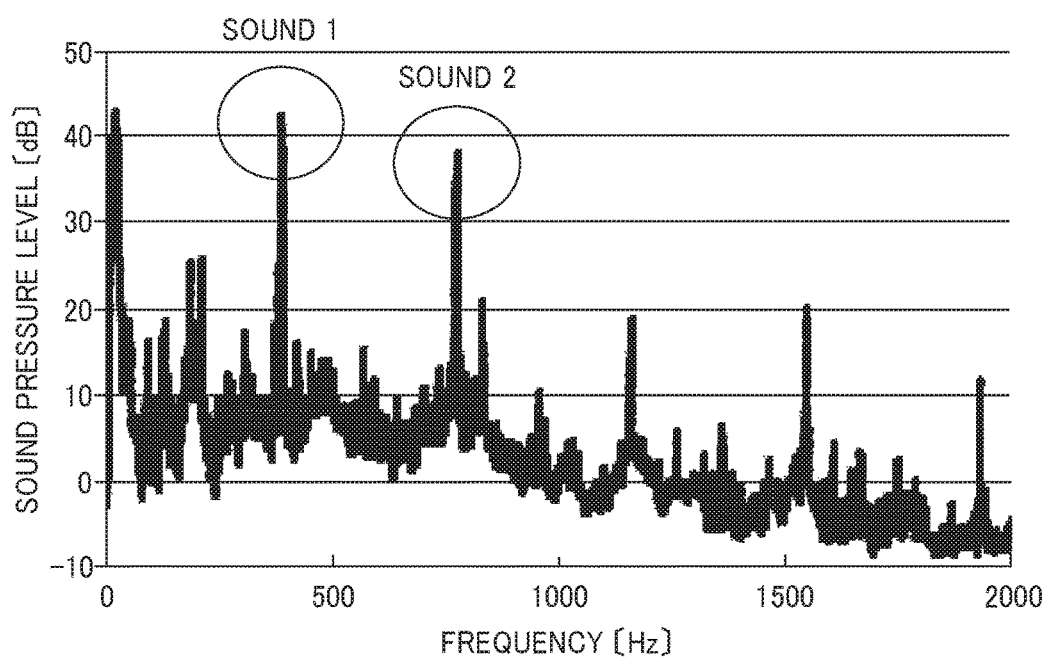
FIG. 4 is a graph of relation of sound pressure level and frequency of sound emitted when a comparative drive device is driven.
Figure 5:
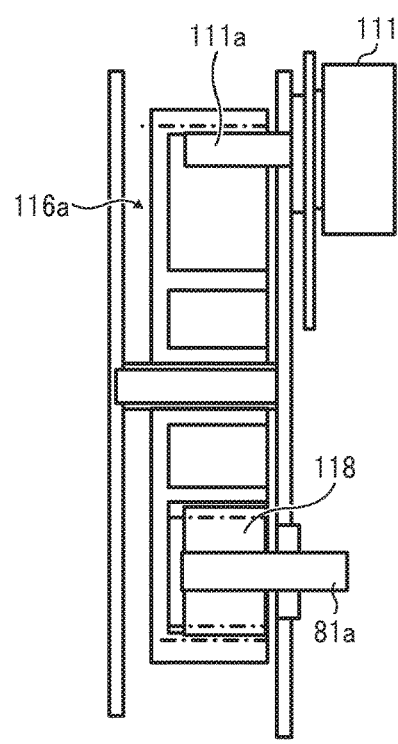
FIG. 5 is a schematic cross sectional view illustrating the comparative drive device in which an internal gear is used as an idler gear.

Here, comparative configurations of a drive device are illustrated in FIGS. 4 and 5. FIG. 4 is a graph of relation of sound pressure level and frequency of sound emitted when a comparative drive device is driven and FIG. 5 is a schematic cross sectional view illustrating another comparative drive device in which an internal gear is used as an idler gear.

The comparative configuration of FIG. 4 includes two gears that are coaxially disposed and rotate together, for example, in which the internal gear 116a and the external gear 116b are disposed together. With this configuration, noise having two peaks, sound 1 and sound 2, are heard as indicated in the graph of FIG. 4. The sound 1 is a noise having a gear mesh frequency of the meshing portion of the internal gear 116a and the motor gear 111a. The sound 2 is a noise having a gear mesh frequency of the meshing portion of the external gear 116b and the output gear 118.

In this case, respective countermeasures to vibration and noise of the gear mesh frequencies are taken. For example, in a case in which Helmholtz sound absorbers are used to restrain the noise, one Helmholtz sound absorber for reducing the gear mesh frequency of the sound 1 of FIG. 4 and another Helmholtz sound absorber for reducing the gear mesh frequency of the sound 2 of FIG. 4 are disposed around the comparative drive device. However, this configuration is likely to increase the size of an image forming apparatus. Further, in order to prevent the defect image generated due to vibration occurred in the meshing portion, the optical components and units of the optical writing unit 27 are designed not to resonate with the whole gear mesh frequencies. Accordingly, the countermeasures to vibration cannot be taken easily. Similarly, it is difficult to prevent plates and motors from resonating with the whole gear mesh frequencies.

In order to address the inconvenience, the output gear 118 can be meshed with the internal gear 116a, so that the internal gear 116a is used as an idler gear in another comparative configuration of the drive device illustrated in FIG. 5. According to the comparative drive device illustrated in FIG. 5, the gear mesh frequency of the meshing portion of the internal gear 116a and the motor gear 111a can be the same as the gear mesh frequency of the meshing portion of the internal gear 116a and the output gear 118. However, in this comparative configuration, a reduction ratio is determined based on the number of teeth of the motor gear 111a and the number of teeth of the output gear 118. Therefore, in order to obtain a high reduction ratio, the diameter of the output gear 118 increases in size, and the size of the image forming apparatus 100 also increases.

By contrast, in the configuration illustrated in FIG. 3, the final reduction ratio is determined based on a value obtained by multiplying the reduction ratio of the internal gear 116a and the motor gear 111a by a reduction ratio of the output gear 118 and the external gear 116b. As a result, a large reduction ratio can be obtained even if the diameter of each gear is small, and therefore an increase in size of the image forming apparatus 100 can be prevented.

Further, in the comparative configuration illustrated in FIG. 5, the motor gear 111a and the output gear 118 are meshed with the internal gear 116a. Therefore, abrasion of the teeth of the internal gear 116a advances quickly, resulting in the early end of service life of the internal gear 116a.

In order to address the inconvenience, the drive device 110 according to the present embodiment adjusts respective modules of the motor gear 111a, the internal gear 116a, the external gear 116b, and the output gear 118 such that a difference of the gear mesh frequency of the meshing portion of the internal gear 116a and the motor gear 111a and the gear mesh frequency of the meshing portion of the external gear 116b and the output gear 118 is set to 100 Hz or smaller.

Table 1 below indicates the number of teeth, modules, the number of rotations, the gear mesh frequencies of respective gears.

TABLE 1

| | | Reference Number | No. of Teeth | Module | No. or Rotations (rpm) | Gear mesh frequency (Hz) |
|---|---|---|---|---|---|---|
| Motor | With External Teeth | 111a | 17 | 0.4 | 1350 | 383 |
| Reduction Gear | With Internal Teeth | 116a | 79 | 0.4 | 291 | 383 |
| | With External Teeth | 116b | 59 | 0.5 | | 286 |
| Output Gear | With External Teeth | 118 | 33 | 0.5 | 519 | 286 |

In the present embodiment, by adjusting the number of teeth, modules, and the number of rotations of respective gears, the difference of the gear mesh frequency of the meshing portion of the motor gear 111a and the internal gear 116a and the gear mesh frequency of the meshing portion of the external gear 116b and the output gear 118 is set to 100 Hz or smaller.

Figure 6A:
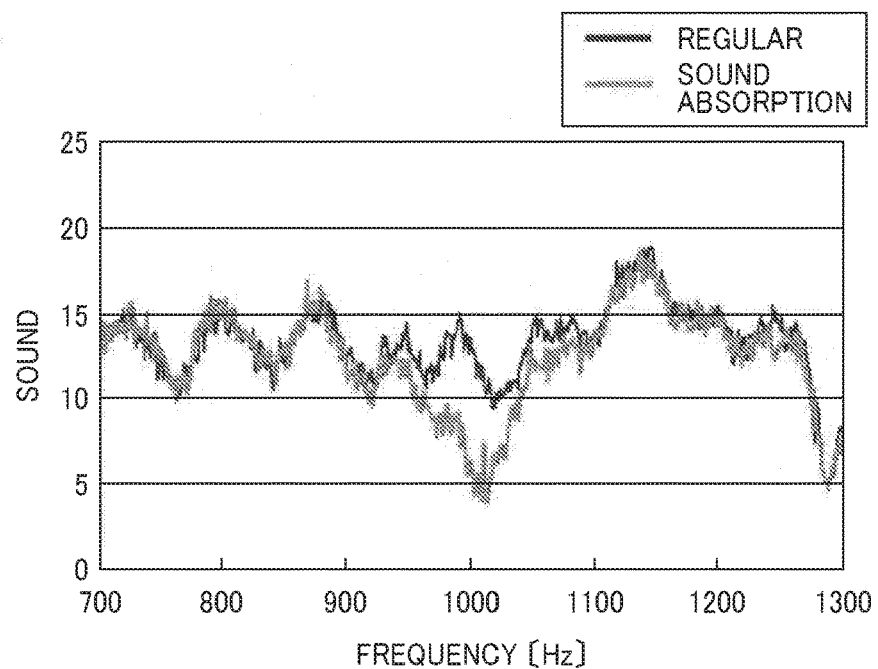
FIG. 6A is a graph illustrating the effect of sound absorption by using Helmholtz sound absorber.
Figure 6B:
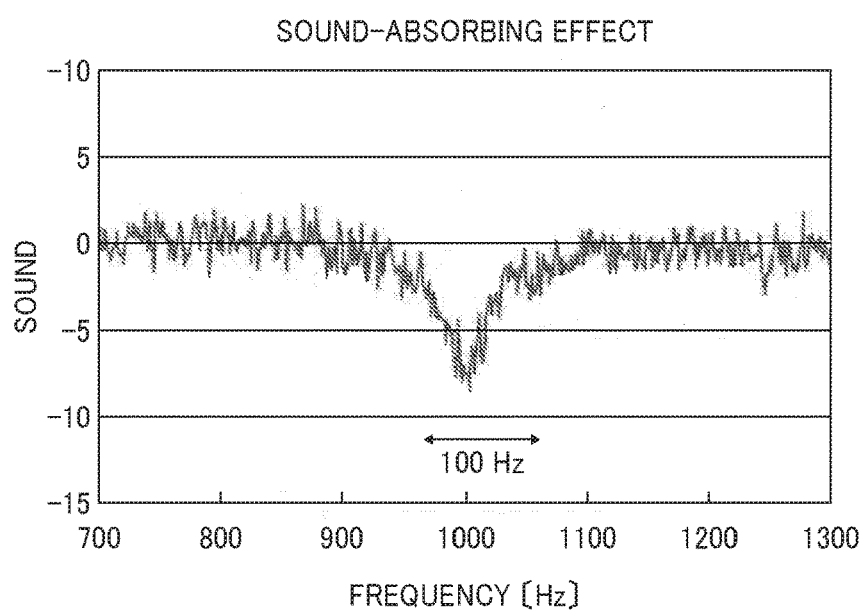
FIG. 6B is a graph illustrating another effect of sound absorption by using Helmholtz sound absorber.

FIG. 6A is a graph illustrating the effect of sound absorption by using the Helmholtz sound absorber. FIG. 6B is a graph illustrating another effect of sound absorption by using the Helmholtz sound absorber.

The Helmholtz sound absorber used in FIGS. 6A and 6B absorbs the frequency of 1000 Hz. As illustrated in FIGS. 6A and 6B, the Helmholtz sound absorber absorbed sound in a range of 1000 Hz±50 Hz. Accordingly, the Helmholtz sound absorber can absorb sound in a range of 100 Hz. Therefore, by setting the difference of the gear mesh frequencies of the meshing portions of gears to 100 Hz or smaller, a noise heard from each meshing portion can be absorbed by a single Helmholtz sound absorber. For example, in the present embodiment, a noise heard from each meshing portion can be absorbed by a Helmholtz sound absorber having a resonance frequency in a resonance space in a range from 286 Hz to 383 Hz.

Further, the gear mesh frequencies of the meshing portions of gears can be set to values close to each other. Therefore, the optical components and units of the optical writing unit 27, the plates, and the motor can be easily designed to be free from resonance with the whole gear mesh frequencies.

In the present embodiment, the motor is rotated at high speed to decelerate significantly by meshing the internal gear and the motor gear. Therefore, the meshing portion of the motor gear and the internal gear is most likely to vibrate and generate noise. Therefore, in the present embodiment, the module of the internal gear 116a and the module of the motor gear 111a are set to be smaller than the module of the rest of gears. By reducing the module of gear, the size of gear tooth can be reduced and the contact ratio of the motor gear 11a and the internal gear 116a can be increased. By so doing, vibration and noise in the meshing portion of the motor gear and the internal gear can be reduced.

Further, as indicated in Table 1, at least one of a pair of gears that form a meshing portion has a prime number of teeth.

As in Table 1, in the present embodiment, the motor gear 111a, the internal gear 116a, and the external gear 116b have respective prime numbers of teeth. Consequently, any tooth on the at least one of the pair of gears contacts each tooth on the other of the pair of gears before encountering the same tooth. Since the shape of each tooth on a gear is different from another tooth on the same gear due to manufacturing error, tooth contacts of gears in mesh vary depending on combinations of teeth of gears. In a case in which a tooth on a gear contacts the same tooth on the other gear with each cycle, the teeth contact in the same manner, which accelerates local wear of the teeth of the gears. However, a gear whose tooth counts is prime can contact a different tooth of the other gear each time the pair of gears mesh with each other. This configuration can spread the wear evenly over the whole teeth of the pair of gears, resulting in an increase in the service life of the gears.

Next, a description is given of a drive device 110A according to a variation of the present embodiment of this disclosure.

Variation 1.

FIG. 7 is a schematic cross sectional view illustrating the drive device 110A of Variation 1. As illustrated in FIG. 7, the drive device 110A includes the motor gear 111a, the internal gear 116a, the external gear 116b, and the output gear 118, which are helical gears. With this configuration, the contact ratio of the gears can be increased, and therefore the meshing vibration and noise can be further restrained.

Further, in Variation 1, it is preferable that a direction of torsion of teeth of the internal gear 116a is set such that a thrust force that is generated when the internal gear 116a rotates directs to the motor side, as indicated by arrow F1 in FIG. 7. Specifically, when the motor shaft is viewed in the axial direction from a side close to the developing roller (hereinafter, the developing roller side), if the motor shaft rotates in the counterclockwise direction, the gear teeth are twisted in a right direction. By contrast, if the motor shaft rotates in the clockwise direction, the gear teeth are twisted in a left direction. That is, the gear teeth are twisted such that the twisted teeth of the helical gear on the developing roller side is disposed to a downstream side from the twisted teeth of the helical gear on the motor side in a direction of rotation of the helical gear. By so doing, when the motor gear 111a is rotated, a thrust force to the developing roller side is generated to press the driving motor 111 against the first plate 112. With this configuration, the posture of the driving motor 111 can be maintained, and therefore occurrence of the meshing vibration can be restrained reliably.

Further, a direction of torsion of teeth of the external gear 116b is set such that a thrust force directs to the developing roller side, as indicated by arrow F2 in FIG. 7, which is an opposite direction of the thrust force of the internal gear 116a. Specifically, the gear teeth of the external gear 116b are twisted in the same direction as the motor gear 111a, which is a reverse direction of the twisted teeth of the internal gear 116a. Consequently, the thrust force of the internal gear 116a is eliminated by the thrust force of the external gear 116b, and therefore the reduction gear 116 moves to the motor side. Therefore, the reduction gear 116 is prevented from rotating while contacting the first plate 112. Accordingly, the good rotation of the reduction gear 116 prevents rotation speed errors, and therefore the developing roller can be rotated reliably.

Further, the external gear 116b of the reduction gear 116 is disposed on an outer circumference of the internal gear 116a whose teeth are formed on an inner circumference of the cylindrical portion. By disposing the external gear 116b on the outer circumference of the internal gear 116a, when compared with the reduction gear 116 of the drive device 110 illustrated in FIG. 3, the reduction gear 116 of the drive device 110A illustrated in FIG. 7 can reduce the length in the axial direction. Accordingly, the size of the drive device 110A can be reduced.

Table 2 below indicates the number of teeth, modules, the number of rotations, the variation meshing frequencies of respective gears in the drive device 110A of Variation 1.

TABLE 2

| | | Reference Number | No. of Teeth | Module | No. or Rotations (rpm) | Gear mesh frequency (Hz) |
|---|---|---|---|---|---|---|
| Motor | With External Teeth | 111a | 12 | 0.5 | 1800 | 360 |
| Reduction Gear | With Internal Teeth | 116a | 79 | 0.5 | 273 | 360 |
| | With External Teeth | 116b | 79 | 0.6 | | 360 |
| Output Gear | With External Teeth | 118 | 33 | 0.6 | 655 | 360 |

Similar to the drive device 110, in the drive device 110A of Variation 1, the external gear 116b is coaxially disposed with the internal gear 116a to rotate together. However, as indicated in Table 2, by adjusting the module of each gear, the number of teeth of the internal gear 116a is set the same as the number of teeth of the external gear 116b. By so doing, the gear mesh frequency of the meshing portion of the motor gear 111a and the internal gear 116a is set the same as the gear mesh frequency of the meshing portion of the external gear 116b and the output gear 118.

Further, a torsional angle of the twisted teeth of each gear is determined based on the module of a pair of gears forming the meshing portion and a distance between the shafts of these gears. Due to the layout of an image forming apparatus, respective locations of a motors and a developing roller are limited. Therefore, even if the module of each gear is set appropriately and the difference of the gear mesh frequencies of the meshing portions is set to 100 Hz or smaller, a center distance between the gears cannot be set preferably. Accordingly, the teeth of one gear cannot mesh with the teeth of the other gear reliably. In that case, by adjusting the torsional angle of the twisted teeth of the helical gear, a pitch distance of gears can be adjusted, and therefore the teeth can be meshed with each other reliably. That is, the torsional angle of the twisted teeth of each gear is determined based on the module of a pair of gears forming the meshing portion and the center distance of the pair of gears.

Variation 2.

FIG. 8 is a schematic cross sectional view illustrating a drive device 110B of Variation 2.

The drive device 110B of Variation 2 includes a reduction gear 126 including a first internal gear 126a and a second internal gear 126b. The first internal gear 126a is meshed with the motor gear 111a and the second internal gear 126b is meshed with the output gear 118.

In Variation 2, the output gear 118 meshes with an internal gear. With this configuration, the contact ratio of the output gear 118 and the second internal gear 126b increases, and therefore vibration and noise produced by gear operation can be restrained. Further, the second internal gear 126b can cover the meshing portion of the second internal gear 126b and the output gear 118, and therefore the meshing noise can be blocked by the second internal gear 126b. The second internal gear 126b is shaped like a cylinder and the motor side is open. Therefore, meshing noise is heard from the second internal gear 126b. However, the second plate 113 is disposed facing the opening of the second internal gear 126b. Therefore, the meshing noise can be prevented from being heard outside the drive device 110A from the second plate 113.

By so doing, vibration and noise in the meshing portion of the output gear 118 and an internal gear can be reduced when compared with the meshing portion of the output gear 118 and an external gear.

Table 3 below indicates the number of teeth, modules, the number of rotations, the variation meshing frequencies of respective gears in the drive device 110B of Variation 2.

TABLE 3

| | | Reference Number | No. of Teeth | Module | No. or Rotations (rpm) | Gear mesh frequency (Hz) |
|---|---|---|---|---|---|---|
| Motor | With External Teeth | 111a | 15 | 0.3 | 1200 | 300 |
| Reduction Gear | With First Internal Teeth | 126a | 80 | 0.3 | 225 | 300 |
| | With Second Internal Teeth | 126b | 78 | 0.6 | | 293 |
| Output Gear | With External Teeth | 118 | 21 | 0.6 | 836 | 293 |

Similar to the drive device 110 and the drive device 110A, in the drive device 110B of Variation 2, the first internal gear 126a and the second internal gear 126b are coaxially disposed. However, as indicated in Table 3, by adjusting the modules of respective gears, the difference of the gear mesh frequency of the meshing portion of the motor gear 111a and the first internal gear 126a and the gear mesh frequency of the meshing portion of the second internal gear 126b and the output gear 118 is set to 100 Hz or smaller.

Variation 3.

Figure 9:
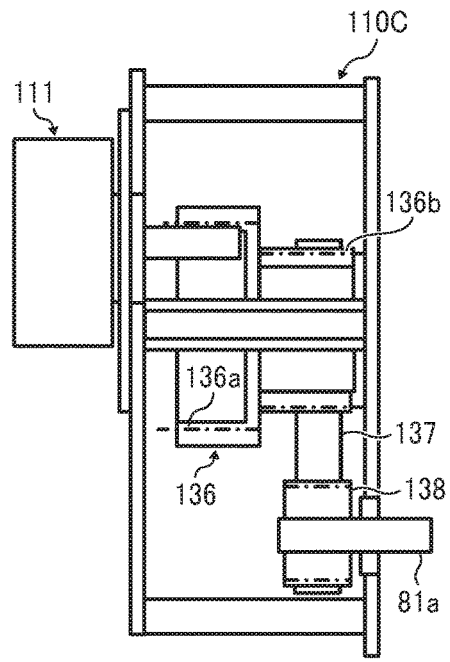
FIG. 9 is a schematic cross sectional view illustrating a drive device of Variation 3.

FIG. 9 is a schematic cross sectional view illustrating a drive device 110C of Variation 3.

The drive device 110C of Variation 3 includes a reduction gear 136 including an internal gear 136a and a pulley 136b. Further, an output pulley 138 is mounted on the development driving shaft 81a. In addition, a timing belt 137 is wound around the pulley 136b and the output pulley 138 so as to contact teeth of the pulley 136b and teeth of the output pulley 138.

In Variation 3, the drive device 110C transmits a drive force from the reduction gear 136 to the development driving shaft 81a via the timing belt 137. Therefore, even if the driving motor 111 is separated away from the developing roller 81, the drive power transmission can be performed with a small number of components.

Table 4 below indicates the number of teeth, modules, pulley tooth shapes, the number of rotations, the variation meshing frequencies of respective gears in the drive device 110C of Variation 3.

TABLE 4

| | | Reference Number | No. of Teeth | Module/ Pulley Tooth Shape | No. or Rotations (rpm) | Gear Mesh Frequency (Hz) |
|---|---|---|---|---|---|---|
| Motor | With External Teeth | 111a | 9 | 0.5 | 1500 | 225 |
| Reduction Gear | With Internal Teeth | 136a | 45 | 0.5 | 300 | 225 |
| | With Pulley | 136b | 40 | S1.5M | | 200 |
| Output Gear | With Pulley | 138 | 37 | S1.5M | 324 | 200 |

The configuration of the drive device 110C of Variation 3 has three meshing portions, which are a meshing portion of the motor gear 111a and the internal gear 136a, a meshing portion of the pulley 136b and the timing belt 137, and a meshing portion of the timing belt 137 and the output pulley 138. However, the timing belt 137 acts as an idler gear. Accordingly, the gear mesh frequency of the meshing portion of the pulley 136b and the timing belt 137 is the same as the gear mesh frequency of the meshing portion of the timing belt 137 and the output pulley 138. Therefore, in the configuration of the drive device 110C of Variation 3, it is likely that the gear mesh frequency of the meshing portion of the timing belt and the pulley that is coaxially disposed with the internal gear is different from the gear mesh frequency of the meshing portion of the internal gear and the motor gear.

However, as indicated in Table 4, by adjusting the modules of respective gears and the pulley tooth shapes of respective pulleys, the difference of the gear mesh frequency of the motor gear 111a and the internal gear 136a and the gear mesh frequency of the meshing portion of the pulleys and the timing belt is set to 100 Hz or smaller.

Variation 4.

Figure 10:
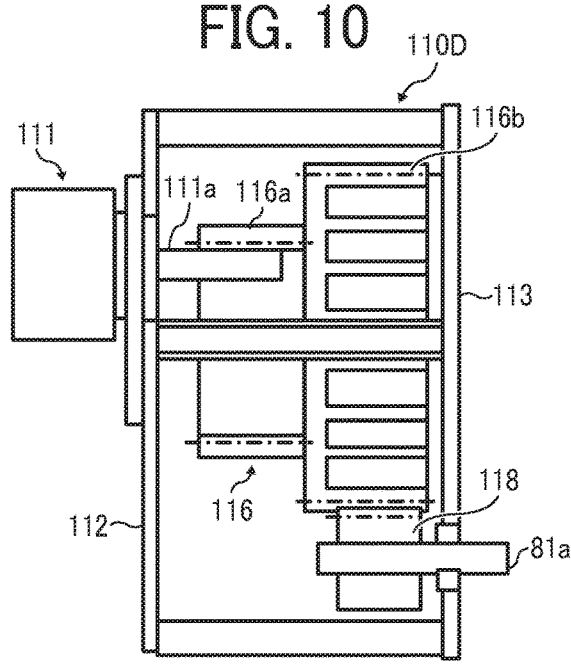
FIG. 10 is a schematic cross sectional view illustrating a drive device of Variation 4.

FIG. 10 is a schematic cross sectional view illustrating a drive device 110D of Variation 4. Table 5 below indicates the number of teeth, modules, the number of rotations, the variation meshing frequencies of respective gears in the drive device 110D of Variation 4.

TABLE 5

| | | | | | | Gear Mesh Frequency (Hz) | |
|---|---|---|---|---|---|---|---|
| | | Reference Number | No. of Teeth | Module | No. or Rotations (rpm) | Primary Element | Secondary Element |
| Motor | With External Teeth | 111a | 15 | 0.3 | 2300 | 575 | 1150 |
| Reduction Gear | With Internal Teeth | 116a | 84 | 0.3 | 411 | 575 | 1150 |
| | With External Teeth | 116b | 160 | 0.3 | | 1095 | 2190 |
| Output Gear | With External Teeth | 118 | 51 | 0.3 | 1289 | 1095 | 2190 |

In Variation 4, as indicated in Table 5, the primary component of the gear mesh frequency of the meshing portion of the external gear 116b and the output gear 118 is different from the secondary component of the gear mesh frequency of the meshing portion of the motor gear 111a and the internal gear 116a by 100 Hz or smaller.

Depending on the configuration of a drive device, there is a case where the noise level of the secondary component of the gear mesh frequency of the meshing portion of the motor gear 111a and the internal gear 116a is greater than the primary component of the gear mesh frequency of the meshing portion of the external gear 116b and the output gear 118.

It is to be noted that the primary component of a gear mesh frequency is a gear mesh frequency that is calculated based on the number of rotations of gears and the number of teeth of the gears. The primary component of the gear mesh frequency is expressed by ($Z*n/60$), where "n" represents the number of rotations of a gear and "Z" represents the number of teeth of the gear. By contrast, the secondary component of a gear mesh frequency is either one of a frequency of 2 or more integral multiples of the primary component and a frequency of ½ or more integral divisions of the primary component. Generally, a noise of the meshing portion corresponds to a noise of the meshing portion of the primary component. However, when the first plate 112 and the second plate 113 resonate with the secondary component of the gear mesh frequency, for example, the noise of the secondary component may increase to exceed the noise of the meshing portion of the primary component.

It is preferable that a drive device rotates a motor at high speed and decelerates the speed significantly at the drive transmitter to obtain a high torque. Therefore, the drive device preferably has the smaller number of teeth of the motor gear and the greater number of teeth of an internal gear. Consequently, a module of the motor gear and the internal gear is previously determined, and the gear mesh frequency of the meshing portion of the motor gear and the internal gear may be determined accordingly. As a result, even if the secondary component of the gear mesh frequency of the meshing portion of the motor gear and the internal gear resonates with the plate, the module of the motor gear and the internal gear cannot be changed easily to prevent resonance of the secondary component and the plate. Accordingly, in this case, countermeasures are taken to prevent noise and vibration with respect to the secondary component of the meshing portion of the motor gear and the internal gear.

In Variation 4, the module of the external gear and the output gear is set such that the gear mesh frequency of the meshing portion of the external gear and the output gear corresponds to the secondary component of the gear mesh frequency of the meshing portion of the motor gear and the internal gear. Accordingly, by taking the countermeasures to prevent noise and the vibration with respect to the secondary component of the gear mesh frequency of the motor gear and the internal gear, the noise and vibration with respect to the gear mesh frequency of the external gear and the output gear can be reduced and restrained.

Next, a description is given of detailed examples of countermeasures to noise reduction of a drive device.

Figure 11:
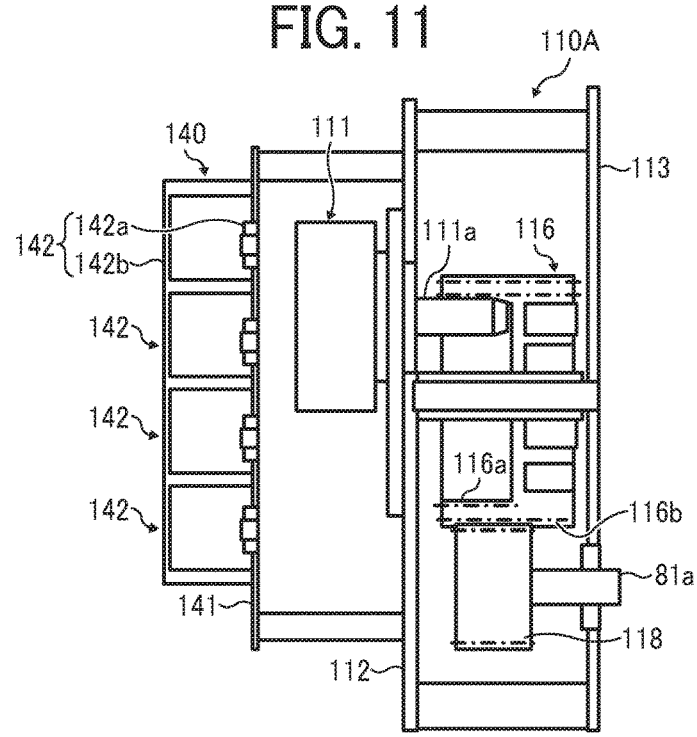
FIG. 11 is a schematic cross sectional view illustrating an example of noise reduction measures.

FIG. 11 is a schematic cross sectional view illustrating an example of noise reduction measures.

A sound absorbing device 140 illustrated in FIG. 11 is included to a drive device in order to absorb sound generated due to vibration of the gear mesh frequency and reduce the sound of the drive device. It is to be noted that the drive device illustrated in FIG. 11 corresponds to the drive device 110A. As illustrated in FIG. 11, the sound absorbing device 140 includes a sound absorbing plate 141 and multiple Helmholtz sound absorbers 142. The sound absorbing plate 141 that is disposed facing a motor side face of the first plate 112 has multiple openings. The multiple Helmholtz sound absorbers 142 are disposed at the multiple openings of the sound absorbing plate 141.

Each of the Helmholtz sound absorbers 142 functions as a resonator that includes a resonance space 142b having a volume (V) and a resonance path 142a having a length (L) and a cross sectional area (S) to cause the resonance space 142b to communicate with outside space. The resonance frequency f of each of the Helmholtz sound absorbers 142 is expressed by an equation, "$f=(c/2\pi)\cdot(S/V-(L+\delta))^{1/2}$". Where "V" represents the volume of the resonance space 142b, "L" represents a length of the resonance path 142a, "S" represents a cross sectional area of the resonance path 142a, "c" represents a sound speed, and "δ" represents an open end correction value. The open end correction value δ is a value to correct the effect of resonance near an entrance of the resonance path 142a. The value around 0.5 is generally employed.

The resonance frequency f of each of the Helmholtz sound absorbers 142 is set in a range from the lowest frequency to the highest frequency of the gear mesh frequencies of the meshing portions of respective gears. Specifically, the gear mesh frequency of each meshing portion corresponds to the values of Table 1, the resonance frequency of each of the Helmholtz sound absorbers 142 is set in a range from 286 Hz to 383 Hz. Further, when the drive device 110A of Variation 1 is employed, the resonance frequency f of the Helmholtz sound absorbers 142 is set to be around 360 Hz. When the drive device 110B of Variation 2 is employed, the resonance frequency f of the Helmholtz sound absorbers 142 is set to be around 300 Hz. When the drive device 110C of Variation 3 is employed, the resonance frequency f of the Helmholtz sound absorbers 142 is set to be around 200 Hz. When the drive device 110D of Variation 4 is employed, the resonance frequency f of the Helmholtz sound absorbers 142 is set to be around 1100 Hz.

As previously described with reference to FIGS. 6A and 6B, the Helmholtz sound absorbers 142 can absorb sound of ±50 Hz relative to a predetermined sound absorbing frequency.

In a case in which the difference of the gear mesh frequency of the meshing portion of the internal gear 116a and the motor gear 111a and the gear mesh frequency of the meshing portion of the external gear 116b and the output gear 118 exceeds 100 Hz, the sound absorbing device 140 has the following configuration so that the gear mesh frequency of the meshing portion of the internal gear 116a and the motor gear 111a and the gear mesh frequency of the meshing portion of the external gear 116b and the output gear 118 are reduced and restrained reliably. Specifically, the Helmholtz sound absorbers to absorb noise having the gear mesh frequency of the meshing portion of the external gear 116b and the output gear 118 are disposed so as to overlap the Helmholtz sound absorbers to absorb noise having the gear mesh frequency of the meshing portion of the internal gear 116a and the motor gear 111a. In this case, the drive device and the image forming apparatus including the drive device increase in size.

As an alternative configuration of the drive device, one half of the multiple Helmholtz sound absorbers is assigned to absorb noise having the gear mesh frequency of the meshing portion of the internal gear 116a and the motor gear 111a and the other half is assigned to absorb noise having the gear mesh frequency of the meshing portion of the external gear 116b and the output gear 118. However, in this case, the Helmholtz sound absorbers cannot absorb noise when the resonance frequency corresponds to the gear mesh frequency of the meshing portion of the external gear and the output gear inserted in the Helmholtz sound absorber of the gear mesh frequency of the meshing portion of the internal gear and the motor gear.

However, in the present embodiment, as indicated in Tables 1 through 5, the difference of the gear mesh frequencies of respective gears is set to 100 Hz or smaller. Therefore, by setting the resonance frequency f of the Helmholtz sound absorbers 142 as described above, a single Helmholtz sound absorber can absorb noise having the gear mesh frequencies of the whole meshing portions of respective gears.

Figure 12:
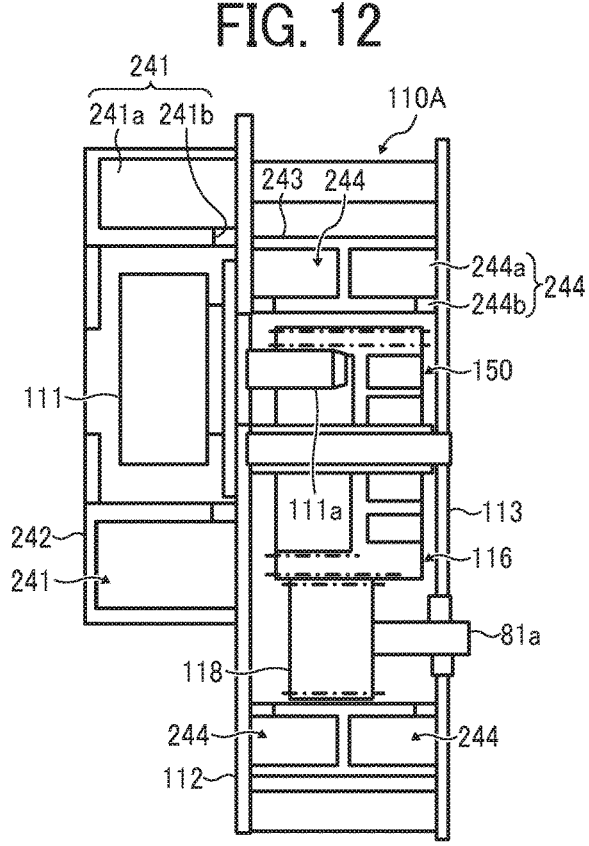
FIG. 12 is a schematic cross sectional view illustrating another example of noise reduction measures.

FIG. 12 is a schematic cross sectional view illustrating another example of noise reduction measures.

As illustrated in FIG. 12, the driving motor 111 and a drive power transmission mechanism 150 are surrounded by Helmholtz sound absorbers 241 and 244, respectively. The drive power transmission mechanism 150 is disposed between the first plate 112 and the second plate 113 and includes multiple gears. Specifically, a motor sound absorbing member 242 includes a cylindrical resin molding product and is attached to the first plate 112 surrounding the driving motor 111. In addition, a drive transmission sound absorbing member 243 includes a cylindrical resin molding product and is attached to the first plate 112 and the second plate 113 surrounding the drive power transmission mechanism 150.

Figure 13:
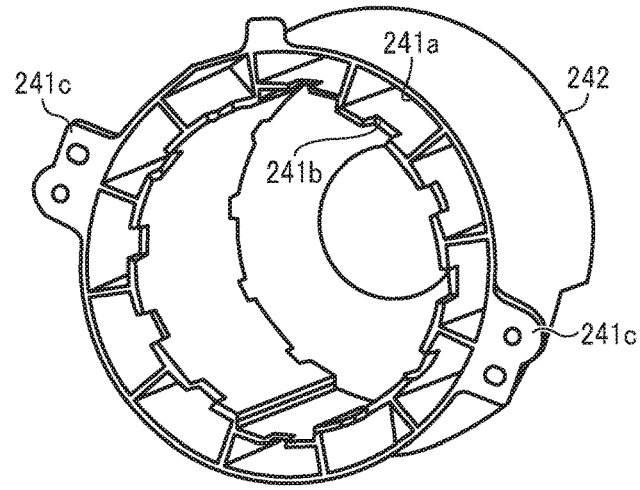
FIG. 13 is a perspective view illustrating a motor sound absorber.

FIG. 13 is a perspective view illustrating the motor sound absorbing member 242.

As illustrated in FIG. 13, the motor sound absorbing member 242 is a cylindrical resin molding product. The motor sound absorbing member 242 includes multiple cavity sections 241a and attaching portions 241c. The multiple cavity sections 241a are disposed along a circumferential direction of the motor sound absorbing member 242. Each of the multiple cavity sections 241a has an opening on one side. Each of the multiple cavity sections 241a has a cut 241b in an inner circumferential surface on the opening side. The attaching portions 241c are disposed on an outer circumference of the motor sound absorbing member 242 to secure the motor sound absorbing member 242 to the first plate 112 with screw.

As illustrated in FIG. 12, the motor sound absorbing member 242 is attached to the first plate 112. By so doing, respective resonance spaces of the Helmholtz sound absorber 241 are defined by the cavity sections 241a and the first plate 112. Further, respective resonance paths of the Helmholtz sound absorber 241 are defined by the first plate 112 and the cuts 241b. Accordingly, the multiple Helmholtz sound absorbers 241 are disposed surrounding the driving motor 111.

The resonance frequency f of the multiple Helmholtz sound absorbers 241 defined by the motor sound absorbing member 242 and the first plate 112 is set to a value between the lowest frequency and the highest frequency of the gear mesh frequencies of the multiple meshing portions. By so doing, the driving motor 111 vibrates due to vibration occurred in the meshing portion, so that the vibration of the gear mesh frequency can be absorbed by the multiple Helmholtz sound absorbers 241 disposed around the driving motor 111.

The drive transmission absorbing member 243 includes cavity sections 244a aligned in the axial direction. Each of the cavity sections 244a includes a cut 244b. The two cavity sections 244a disposed on the motor side have respective openings that are blocked by the first plate 112. By so doing, respective resonance spaces of the Helmholtz sound absorbers 244 are formed. Further, respective resonance paths of the Helmholtz sound absorbers 244 are defined by the first plate 112 and the cuts 244b. Further, the cavity sections 244a disposed on the developing roller side have respective openings that are blocked by the second plate 113. By so doing, respective resonance spaces of the Helmholtz sound absorbers 244 are formed. Further, respective resonance paths of the Helmholtz sound absorbers 244 are defined by the cuts 244b and the second plate 113. Accordingly, the multiple Helmholtz sound absorbers 244 are disposed surrounding the drive power transmission mechanism 150.

The resonance frequency f of the multiple Helmholtz sound absorbers 244 defined by the drive transmission absorbing member 243, the first plate 112, and the second plate 113 is set to a value between the lowest frequency and the highest frequency of the gear mesh frequencies of the multiple meshing portions. Therefore, the multiple Helmholtz sound absorbers 244 can absorb noise having the gear mesh frequencies of the whole meshing portions of respective gears.

A Helmholtz sound absorber that absorbs sound incident to the absorber, and therefore is effective to dispose around the sound source. In a case in which the Helmholtz sound absorbers are disposed around the sound source such as the drive power transmission mechanism 150 and the driving motor 111, at least four sound absorbing device 140 are disposed on each side of the sound source. This configuration increases the number of components, resulting in an increase in costs.

However, the sound source can be surrounded by the Helmholtz sound absorbers on each side when the motor sound absorbing member 242 of FIG. 13 is attached to the plate of the drive device 110 having the configuration illustrated in FIG. 12. Consequently, the number of components of the drive device can be reduced when compared with the configuration employing the sound absorbing device 140. Accordingly, this configuration can reduce the cost of the drive device.

Figure 14:
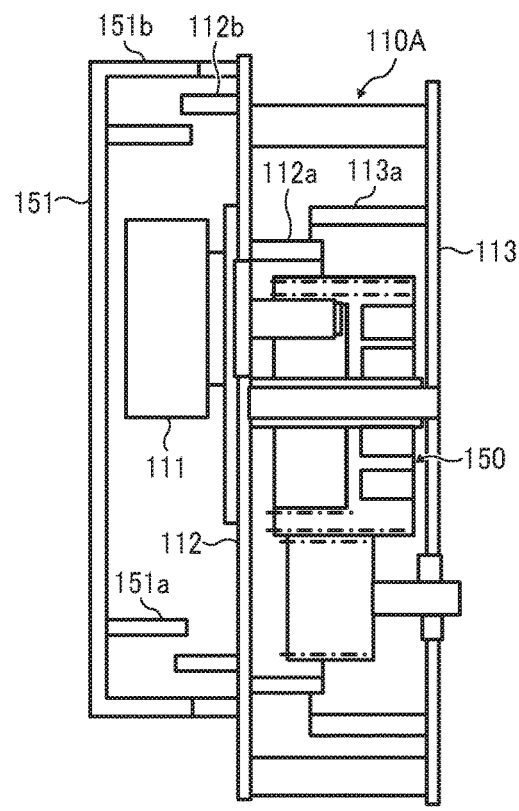
FIG. 14 is a schematic cross sectional view illustrating yet another example of noise reduction measures.

FIG. 14 is a schematic cross sectional view illustrating yet another example of noise reduction measures.

In FIG. 14, a structure around the driving motor 111 and the drive power transmission mechanism 150 is made in labyrinth structure to reduce the noise from the driving motor 111 and the drive power transmission mechanism 150.

As illustrated in FIG. 14, the drive device such as the drive device 110A includes a cover 151 to cover the driving motor 111. An end portion 151b of the cover 151 is bent toward the first plate 112. The leading edge of the end portion 151b faces the first plate 112 with a predetermined gap. The cover 151 includes a first motor side rib 151a that extends toward the first plate 112. A second motor side rib 112b is disposed between the first motor side rib 151a and the end portion 151b of the cover 151 and extending from the first plate 112 toward the cover 151. The second motor side rib 112b is disposed such that at least a portion of the leading edge faces the end portion 151b of the cover 151 and the first motor side rib 151a. According to the layout of the drive device with the drive power transmission mechanism 150 illustrated in FIG. 14, an air flow path is made as a labyrinth air flow path having multiple turns and corners to communicate from the inside of the cover 151 to the outside of the cover 151.

Noise generated when the driving motor vibrates due to vibration occurred in each meshing portion is blocked by the cover. In addition, noise spreading in the vertical direction in FIG. 14 is diffracted by the first motor side rib 151a and the second motor side rib 112b, and is then leaked. Each time sound is diffracted, the sound attenuates. Therefore, when the sound is leaked from a gap between the end portion 151b of the cover 151 and the first plate 112, the sound is attenuated sufficiently. Consequently, the leaked sound does not turn into noise harsh to a user or uses. In addition, heat of the driving motor can be escaped to the outside by passing through the labyrinth air flow path. Therefore, an increase in temperature around the drive device can be prevented.

A first power transmission mechanism side rib 112a is disposed extending to the developing roller side from the first plate 112 on a side facing the second plate 113. A second power transmission mechanism side rib 113a is disposed extending to the motor side from the second plate 113 on a side facing the first plate 112. The second power transmission mechanism side rib 113a is disposed outside from the first power transmission mechanism side rib 112a. At least a portion of the leading edge of the second power transmission mechanism side rib 113a is disposed facing the first power transmission mechanism side rib 112a. Accordingly, an air flow path is made as a labyrinth air flow path having one turn to communicate from the inside of the drive power transmission mechanism 150 to the outside of the cover 151. With this structure, sound is diffracted by the first power transmission mechanism side rib 112a and the second power transmission mechanism side rib 113a before leaking from the drive device. Therefore the leading sound can be attenuated sufficiently.

In the labyrinth structure, high frequency sound can be attenuated reliably. It is because low frequency sound has lower attenuation effect due to diffraction than high frequency sound. In a case in which one gear of coaxially mounted gears is a high gear mesh frequency and the other gear is a low meshing frequency, if noise reduction measures are taken using the labyrinth structure, noise having the gear mesh frequency of the meshing portion of the other gear cannot be reduced. However, in the present embodiment, the modules of the gears are adjusted based on the high gear mesh frequency of the meshing portion of the one gear to set the difference of the gear mesh frequencies of the meshing portions to 100 Hz or smaller. By so doing, the gear mesh frequencies of the whole meshing portions can be made the high gear mesh frequency. Furthermore, when providing the labyrinth structure, the gear mesh frequencies of the whole meshing portions can be reduced reliably.

The noise reduction measures with the labyrinth structure is effective to sound having high frequency. Therefore, as described in Variation 4, the noise reduction measures are effective when the modules of the respective gears are adjusted such that the noise level of the secondary component of integral multiples of the gear mesh frequency of the meshing portion of the motor gear 111a and the internal gear 116a is the highest and that the gear mesh frequencies of the other meshing portions correspond to the gear mesh frequency of the secondary component.

In the above-described embodiments, the developing roller functions as a drive transmission object that is driven by the drive device. However, the configuration is not limited thereto. For example, the photoconductor can function as the drive transmission object.

The configurations according to the above-descried embodiments are not limited thereto. This disclosure can achieve the following aspects effectively.

Aspect 1.

A drive device (for example, the drive device 110) includes a drive motor (for example, the driving motor 111) and a plurality of gears (for example, the motor gear 111a, the internal gear 116a, the external gear 116b, and the output gear 118). The plurality of gears are driven by the drive motor and includes at least two gears disposed coaxially with each other. The plurality of gears have a plurality of meshing portions. Each meshing portion is formed between a pair of gears out of the plurality of gears. A difference between respective gear mesh frequencies of the plurality of meshing portions is set to be equal to or smaller than 100 Hz.

As described in the embodiments above, the comparative drive device was examined to find causes to generate noises having different frequencies from each other. It was found through the examination that the gear mesh frequencies of respective meshing portions of the coaxially disposed gears are different from each other, which was a cause of occurrence of noises having the different frequencies. Accordingly, the gear mesh frequency is determined based on the number of teeth of a gear and the number of rotations of the gear. Therefore, when a gear mesh frequency is calculated based on the number of teeth of one gear out of a pair of gears and the number of rotations of the one gear or based on the number of teeth of the other gear out of the pair of gears and the number of rotations of the other gear, the same calculation result is obtained. Therefore, in a case in which the whole gears are not disposed coaxially, in other words, in which the whole gears that are disposed between the motor gear of the motor and the output gear that outputs a driving force to a drive transmission object such as the developing roller are idler gears, the whole gear mesh frequencies of the meshing portions of the gears are identical to each other. However, two or more gears disposed coaxially are different in gear mesh frequency when the two or more gears have the different numbers of teeth from each other. Therefore, in a configuration in which two or more gears are disposed coaxially, some gear mesh frequencies of the meshing portions of the two or more gears may be different from each other.

In order to address the inconvenience, in Aspect 1, the difference between respective gear mesh frequencies of the meshing portions is set to be equal to or smaller than 100 Hz, so that a difference between vibrations generated in the meshing portions of the gears and a difference between the frequencies of noises occurred due to the vibrations are set to be equal to or smaller than 100 Hz.

A sound absorbing device that is used to reduce the noise can absorb sound in a range of 100 Hz. For example, the Helmholtz sound absorber that functions as the sound absorbing device can absorb sound in a range of 100 Hz (±50 Hz relative to a target resonance frequency), as illustrated in FIG. 6. Therefore, noise generated due to vibration in the meshing portions of the gears can be absorbed by providing the Helmholtz sound absorber with a target frequency set between a lowest frequency and a highest frequency out of the whole gear mesh frequencies of the meshing portions of the gears.

As described above, if a predetermined single measure is taken, noise generated due to vibration at the gear mesh frequencies of the whole meshing portions of the gears can be reduced. Therefore, the noise reduction measure can be taken easily when compared with a predetermined noise reduction measure taken for each gear mesh frequency of the meshing portions. Consequently, noise can be reduced easily.

Aspect 2.

In Aspect 1, the plurality of meshing portions include a reference meshing portion having a reference gear mesh frequency. A greatest sound component is greatest in sound level out of sound components having integral multiples of the reference gear mesh frequency of the reference meshing portion and sound components having integral divisions of the reference gear mesh frequency of the reference meshing portion, and a difference between a gear mesh frequency of the greatest sound component and each gear mesh frequency of sound components of the rest of the plurality of meshing portions is set equal to or smaller than 100 Hz.

According to this configuration, as described in Variation 4, the greatest sound component is greatest in sound level out of sound components (for example, the primary component and the secondary component) of the reference gear mesh frequency of the reference meshing portion, and a difference between the gear mesh frequency of the greatest sound component and each gear mesh frequency of the other meshing portions is set to be equal to or smaller than 100 Hz. By so doing, noise of the drive device and the image forming apparatus can be reduced and restrained.

Aspect 3.

In Aspect 2, the plurality of gears include a motor gear (for example, the motor gear 111a) of the drive motor and a mating gear (for example, the internal gear 116a) meshing with the motor gear. The motor gear and the mating gear mesh with each other in the reference meshing portion.

According to this configuration, as described in Variation 4, the meshing portion of the motor gear and the mating gear is the reference meshing portion. By so doing, the motor gear and the mating gear can be constructed not to meet the gear mesh frequency thereof with the gear mesh frequencies of the other meshing portions but to obtain a higher torque. Specifically, in this configuration, the number of teeth of the motor gear is reduced as possible and the number of teeth of the mating gear is increased as possible. Then, by meeting the gear mesh frequencies of the other meshing portions of the other gears with the reference gear mesh frequency of the reference meshing portion, the drive device can provide a higher torque and perform noise reduction measures easily.

Aspect 4.

In any one of Aspect 1 through Aspect 3, a module of each gear of the plurality of gears is set such that a difference between the gear mesh frequencies of the meshing portions are equal to or smaller than 100 Hz.

According to this configuration, by adjusting the module of each gear, a difference between the gear mesh frequencies of the meshing portions can be set to be equal to or smaller than 100 Hz.

Aspect 5.

In any one of Aspect 1 through Aspect 4, the plurality of gears include a helical gear.

According to this configuration, as described in the as described in the embodiments above, the contact ratio can be increased, and therefore vibration and noise in the meshing portions can be prevented.

Aspect 6.

In Aspect 5, the helical gear has a torsion angle based on a module of the pair of gears that form the meshing portion and a distance between respective axes of the pair of gears.

According to this configuration, as described in Variation 1, the diameter of a pitch circle of a gear can be adjusted based on the torsion angle. Therefore, according to this configuration, the torsion angle of the helical gear is set based on the module of the pair of gears that includes a meshing portion and a distance between the respective axes of the pair of gears. Therefore, the teeth can be meshed reliably.

Aspect 7.

In any one of Aspect 1 through Aspect 6, the number of teeth of at least one gear of the pair of gears is a prime number.

According to this configuration, as described in the embodiments above, meshing of the same teeth each time the pair of gears contact can be prevented, and therefore each tooth wears evenly. Consequently, the service life of the gears can increase.

Aspect 8.

In any one of Aspect 1 through Aspect 7, the plurality of gears include a motor gear of the drive motor and a mating gear meshing with the motor gear, and a module of the motor gear and a module of the mating gear are smaller than modules of the rest of the plurality of gears.

As described in the embodiments above, after the driving motor is rotated at high speed, the speed is decelerated significantly by meshing the motor gear and the mating gear. Therefore, the meshing portion of the motor gear and the mating gear is most likely to vibrate and generate noise.

Therefore, the module of the mating gear and the module of the motor gear are set to be smaller than the module of the rest of the plurality of gears. By so doing, the size of gear tooth can be reduced, and the contact ratio of the motor gear and the mating gear can be increased. According to this configuration, occurrence of vi and noise in the meshing portion of the motor gear and the mating gear can be reduced, and therefore noise and vibration of the drive device and the image forming apparatus can be prevented effectively.

Aspect 9.

In any one of Aspect 1 through Aspect 8, the motor gear (for example, the motor gear 111a) and the mating gear (for example, the internal gear 116a) includes an internal gear.

As described in the embodiments above, after the driving motor is rotated at high speed, the speed is decelerated significantly by meshing the motor gear and the mating gear. Therefore, the meshing portion of the motor gear and the mating gear is most likely to vibrate and generate noise.

Therefore, in Aspect 9, the mating gear that meshes with the motor gear is an internal gear (for example, the internal gear 116a). By so doing, when compared with a configuration in which the mating gear is an external gear, the internal gear can increase the contact ratio with the motor gear, and therefore can prevent occurrence of noise and vibration in the meshing portion. In addition, the internal gear can cover the meshing portion, and therefore the configuration can prevent noise generated in the meshing portion from leaking to the outside of the drive device or the image forming apparatus. Accordingly, occurrence of vibration and noise in the meshing portion of the motor gear and the mating gear can be reduced, and therefore noise and vibration of the drive device and the image forming apparatus can be prevented effectively.

Aspect 10.

In Aspect 9, the drive device (for example, the drive device 110) further includes a reinforcing projection (for example, the reinforcing projections 116c) mounted on the internal gear (for example, the internal gear 116a).

The internal gear includes internal teeth on an inner circumference of a cylindrical body. Therefore, when compared with an external gear having external teeth on an outer circumference of a cylindrical body, the rigidity of the internal gear is lower.

In order to address this inconvenience, in Aspect 10, the drive device includes the reinforcing projection to reinforce the internal gear. By so doing, the rigidity of the internal gear can be increased. Therefore, when a driving force is transmitted from the motor gear (for example, the motor gear 111a), deformation of the internal gear can be reduced. Consequently, abnormal wear of gear teeth and meshing vibration can be prevented.

Aspect 11.

In Aspect 9 or Aspect 10, the internal gear (for example, the internal gear 116a) has internal helical teeth arranged such that one side far from the drive motor (for example, the driving motor 111) is disposed downstream from an opposite side near the drive motor in a direction of rotation of the motor gear (for example, motor gear 111a).

According to this configuration, as described in the embodiments above, a thrust force that directs to the opposite side to the drive motor is generated to the motor gear. Therefore, the drive motor can be pressed against a positioning member such as a motor support plate to position the drive motor. With this configuration, the posture of the drive motor can be maintained, and therefore occurrence of the meshing vibration can be restrained reliably.

Aspect 12.

In any one of Aspect 9 through Aspect 11, the internal gear includes a cylindrical portion that includes internal teeth mounted on an inner circumferential surface and a drive transmitter mounted on an outer circumferential surface.

According to this configuration, as described in Variation 1, when compared with a configuration in which the internal gear and the external gear are aligned in the axial direction, the length of the reduction gear (for example, the reduction gear 116) can be reduced, and therefore the size of the drive device can be reduced.

Aspect 13.

In any one of Aspect 1 through Aspect 12, the two gears (for example, the internal gear 116a and the external gear 116b) coaxially disposed are integrally formed in a single body and include respective helical gears having different twist directions from each other.

According to this configuration, by providing the two gears having respective helical teeth, the contact ratio can be increased, as described above, and vibration and noise of the respective meshing portion of the two gears that are integrally formed in a single body can be prevented.

Further, as described in Variation 1, a thrust force of one helical gear of the two gears integrally formed in a single body can eliminate by a thrust force of the other helical gear of the two gears. Therefore, this configuration can prevent that the single body (for example, the reduction gear 116) integrally including the two gears moves to one plate close to the drive motor or another plate close to the developing roller and contacts either one of these plates while rotating.

Accordingly, the good rotation of the single body integrally including the two gears can prevent rotation speed errors, and therefore a drive transmission object (for example, the developing roller 81) can be rotated reliably.

Aspect 14.

In any one of Aspect 1 through Aspect 13, the drive device (for example, the drive device 110) further includes a sound absorber (for example, the sound absorber 140) to absorb a sound having a gear mesh frequency of each of the plurality of meshing portions.

According to this configuration, a difference between the gear mesh frequencies of the meshing portions of the plurality of gears is set to be equal to or smaller than 100 Hz. Therefore, the sound absorber can absorb noise in each meshing portion by setting the frequency to absorb the sound in a range from the lowest frequency to the highest frequency of the gear mesh frequency of each meshing portion.

Aspect 15.

In Aspect 14, the sound absorber includes a resonator (for example, the Helmholtz sound absorber 142). The resonator includes a resonance space to acoustically resonate with a sound at a predetermined resonance frequency and a resonance path communicating with the resonance space to guide the sound from an outside of the resonance space to an inside of the resonance space.

According to this configuration, the sound absorber can be formed by providing the resonance space having a cavity section and an opening that communicates with the resonance space. With this simple configuration, the noise of the gear mesh frequency of the meshing portion of each pair of gears can be absorbed.

Further, the sound can be absorbed in a range of 100 Hz. By setting a difference between the gear mesh frequencies of the meshing portions of each pair of gears to 100 Hz or smaller, a single resonator can absorb noise of the gear mesh frequency of the meshing portion of each pair of gears.

Aspect 16.

The drive motor (for example, the driving motor 111) transmits a driving force to a drive transmission object. The drive transmission object is a developing roller (for example, the developing roller 81). Consequently, noise can be reduced while driving the developing roller.

Aspect 17.

The drive motor (for example, the driving motor 111) transmits a driving force to a drive transmission object. The drive transmission object is a photoconductor (for example, the photoconductor 24). Consequently, noise can be reduced while driving the photoconductor.

Aspect 18.

An image forming apparatus (for example, the image forming apparatus 100) includes the drive device (for example, the drive device 110) according to any one of Aspect 1 through Aspect 17, and an image forming device (for example, the process units 26K, 26C, 26M, and 26Y) to receive a driving force transmitted from the drive device.

According to this configuration, vibration and noise in the meshing portion of the drive device can be prevented easily, and therefore a reduction in noise of the drive device and the image forming apparatus can be achieved and defect images such as banding can be prevented easily.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. A drive device comprising:
   a drive source;
   a drive gear mounted on the drive source and having an externally toothed part;
   a first drive transmission gear drivingly coupled with the drive gear and having a first transmission portion and a second transmission portion, the first transmission portion including an internally toothed part on an inner circumference to mesh with the externally toothed part of the drive gear;
   a second drive transmission body drivingly coupled with the first drive transmission gear and with a drive target body; and
   an endless body wound around the second transmission portion and the second drive transmission body.

2. The drive device according to claim 1, wherein the externally toothed part of the drive gear and the internally toothed part of the first transmission portion are meshed directly.

3. The drive device according to claim 1, wherein an outer diameter of the first transmission portion is greater than an outer diameter of the second transmission portion.

4. The drive device according to claim 1,
   wherein a first externally toothed part is mounted on an outer circumferential surface of the second transmission portion,
   wherein a second externally toothed part is mounted on an outer circumferential surface of the second drive transmission body, and
   wherein an internally toothed part that is mounted on an inner circumferential surface of the endless body, the internally toothed part is meshed with the first externally toothed part and the second externally toothed part.

5. A drive device comprising:
   a drive source;
   a drive gear mounted on the drive source and having an externally toothed part;
   a first drive transmission gear drivingly coupled with the drive gear and having a first transmission portion and a second transmission portion, the first transmission portion including an internally toothed part on an inner circumference to mesh with the externally toothed part of the drive gear;
   a second drive transmission body drivingly coupled with the first drive transmission gear and with a drive target body; and
   an endless body wound around the second transmission portion and the second drive transmission body,
   wherein a first externally toothed part is mounted on an outer circumferential surface of the second transmission portion,
   wherein a second externally toothed part is mounted on an outer circumferential surface of the second drive transmission body, and
   wherein an internally toothed part that is mounted on an inner circumferential surface of the endless body, the internally toothed part is meshed with the first externally toothed part and the second externally toothed part, wherein a difference between a first gear mesh frequency of a meshing portion of the externally toothed part of the drive gear and the internally toothed part of the first transmission portion and a second gear mesh frequency of a meshing portion of the first externally toothed part of the second transmission portion and the internally toothed part of the endless body is set to be equal to or smaller than 100 Hz.

6. The drive device according to claim 5, wherein a difference between the first gear mesh frequency of the meshing portion of the externally toothed part of the drive gear and the internally toothed part of the first transmission portion and a third gear mesh frequency of a meshing portion of the second externally toothed part of the second drive transmission body and the internally toothed part of the endless body is set to be equal to or smaller than 100 Hz.

7. The drive device according to claim 1, wherein the second drive transmission body is a driven rotary body having the drive target body mounted coaxially with a rotary shaft thereof.

8. The drive device according to claim 1, wherein the first drive transmission gear is rotatably supported by a support shaft that is disposed between a first frame and a second frame, wherein the drive source is disposed on a side of the first frame, which is an opposite side of the first frame where the first transmission portion of the first drive transmission gear faces the first frame, and wherein the second drive transmission body is disposed on a same side of the second frame as the second transmission portion of the first drive transmission gear.

9. The drive device according to claim 1, wherein the drive target body is a developing roller.

10. The drive device according to claim 1, wherein the drive target body is an image bearer.

11. An image forming apparatus comprising:

the drive device according to claim 1; and an image forming device to receive a driving force transmitted from the drive device.

* * * * *